United States Patent [19]

Giroux

[11] Patent Number: 4,465,261

[45] Date of Patent: Aug. 14, 1984

[54] APPARATUS FOR PULLING AN ELECTRIC CABLE OR WIRE

[76] Inventor: Davis W. Giroux, 3 Lakewood Villa, Lake Manawa, Council Bluffs, Iowa 51501

[21] Appl. No.: 445,147

[22] Filed: Nov. 29, 1982

[51] Int. Cl.³ .................. B66D 1/26; B66D 1/08; B66D 3/00

[52] U.S. Cl. ..................... 254/279; 254/134.3 FT; 254/315; 254/333; 254/382

[58] Field of Search ............... 254/134.3 R, 134.3 FT, 254/264, 279, 280, 287, 315, 324, 325, 326, 327, 333, 382; 242/155 BW; 57/210

[56] References Cited

U.S. PATENT DOCUMENTS 2,991,024 7/1961 Goode ........................ 254/134.3 R
3,481,134 12/1969 Whewell, Jr. .................... 57/210 X
3,750,970 8/1973 Tremoulet, Jr. ................ 254/382 X
3,941,324 3/1976 Green ........................ 242/155 BW X

FOREIGN PATENT DOCUMENTS 703315 2/1965 Canada ............................ 254/325

Primary Examiner—Stuart S. Levy
Assistant Examiner—Katherine Jaekel
Attorney, Agent, or Firm—Zarley, McKee, Thomte, Voorhees & Sease

[57] ABSTRACT

An apparatus for pulling an electric cable or wire between two locations such as along the length of a pipeline is described including an engine mounted in the box of a truck and having a pinch wheel operatively connected thereto. A torque balanced pulling rope is extended around the pinch wheel and passes through spaced-apart sheaves mounted on the pipeline. The free end of the rope is connected to the electric cable which is to be pulled along the length of the pipeline. The rope passes from the pinch wheel to an automatic rope tender mounted on a trailer positioned rearwardly of the truck. The automatic rope tender is operated at a slightly greater grade than the sheave wheel and deposits or drops the rope into a storage container. The automatic rope tender includes means for lifting the storage container from the ground to enable the container to be moved from one location to another.

7 Claims, 14 Drawing Figures

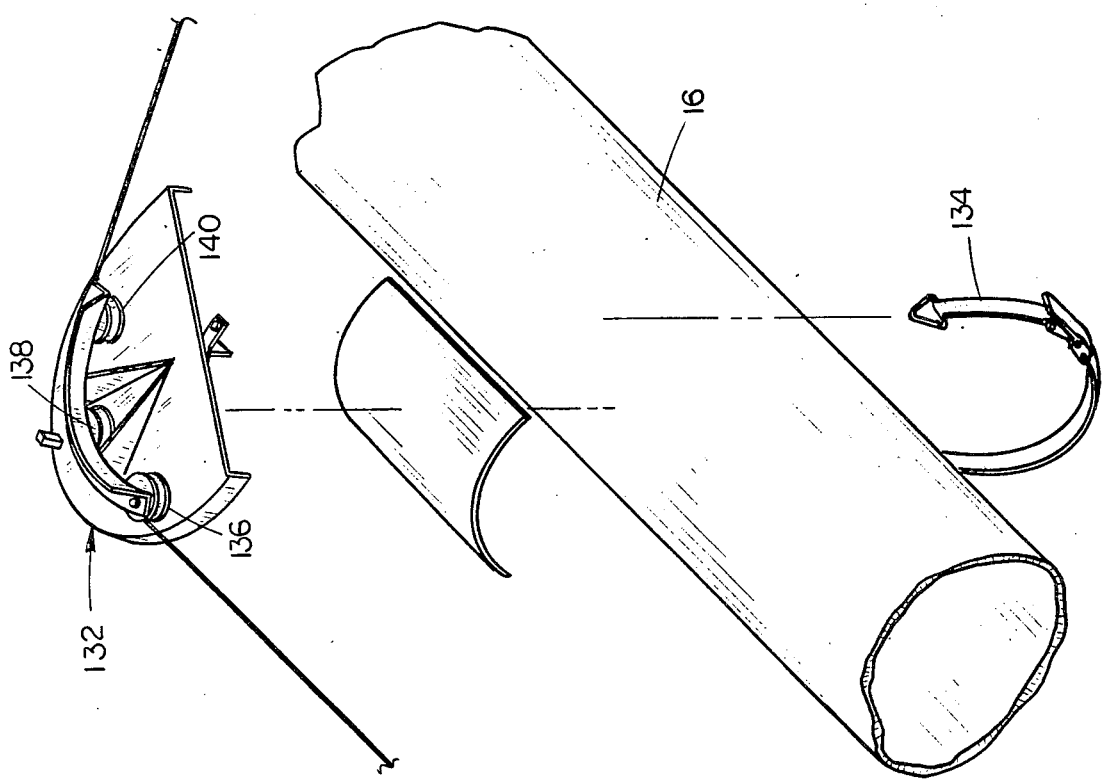
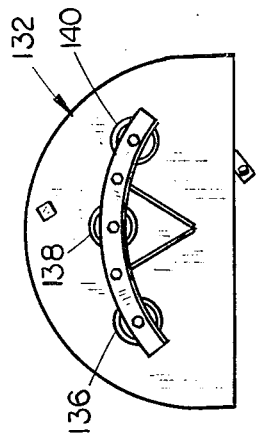
FIG. 10
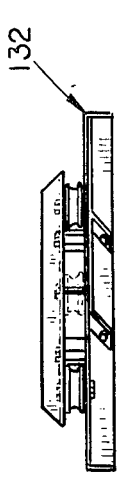
FIG. 11
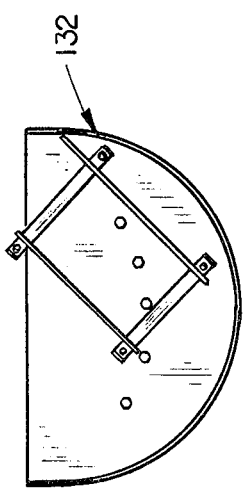
FIG. 12
FIG. 13

APPARATUS FOR PULLING AN ELECTRIC CABLE OR WIRE

BACKGROUND OF THE INVENTION

It is frequently necessary to run electric cable along the length of a pipeline so that electricity can be supplied to remote pumping stations, etc. Heretofore, the electric cable was either pulled by hand along the length of the pipeline or pulled along the length of the pipeline by a truck or the like. Some pulling machines have been provided but they are not convenient to use and frequently subject the electric cable to undue stress. Further, the conventional pulling machines are not able to pull great lengths of the cable.

Although the apparatus described herein is ideally well-suited for pulling an electric cable or wire along the length of a pipeline, the apparatus is also well-suited to pull electric wires between towers of an electrical transmission line.

Therefore, it is a principal object of the invention to provide an improved apparatus for pulling an electric cable or wire.

Still another object of the invention is to provide an electric cable puller which is able to pull extremely long lengths of cable.

Still another object of the invention is to provide an electric cable puller which includes an automatic rope tender.

Still another object of the invention is to provide an electric cable puller which utilizes a torque balanced rope connected to the electric cable.

Still another object of the invention is to provide an electric cable puller which includes a powered rotatable pinch wheel which enables great lengths of cable to be pulled.

Still another object of the invention is to provide an electric cable puller including a rope tender which may be moved from one location to another.

Still another object of the invention is to provide an electric cable puller which does not subject the pulling rope or electric cable to undue stresses.

Still another object of the invention is to provide an apparatus for pulling an electric cable or wire between two locations.

Still another object of the invention is to provide an apparatus for pulling an electric cable or wire between the towers of a transmission line.

Still another object of the invention is to provide an electric cable puller which is convenient to use and is durable in use.

These and other objects will be apparent to those skilled in the art.

BRIEF DESCRIPTION OF THE DRAWINGS

FIG. 10 is a top view of still another form of a sheave support:

FIG. 11 is a side view of the sheave support of FIG. 10:

FIG. 12 is a bottom view of the sheave support of FIGS. 10 and 11:

FIG. 13 is an exploded perspective view of the sheave support of FIG. 10 showing its relationship to the pipeline.

SUMMARY OF THE INVENTION

Figure 1:
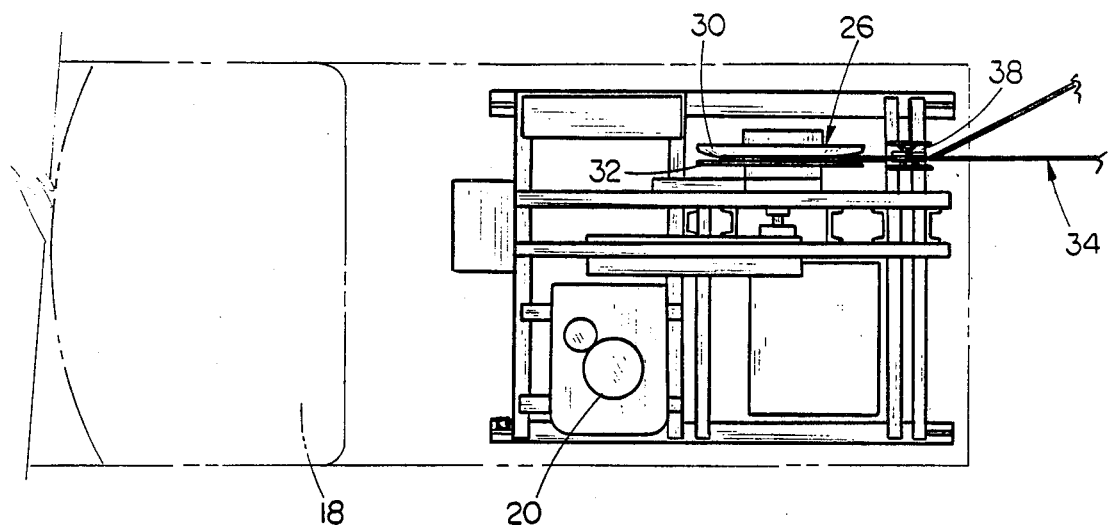
FIG. 1 is a top view of the cable puller mounted in a truck which is shown in broken lines.

An electric cable puller is described for pulling electric cable or wire, such as along the length of a pipeline. The apparatus comprises a pulling unit mounted in the bed or box of a pickup truck and an automatic rope tender positioned rearwardly thereof. The pulling apparatus comprises a power means which hydrostatically drives a rotatable pinch wheel. A torque balanced rope extends around the pinch wheel and has its working end connected to the cable which is to be pulled along the length of the pipeline. The free end of the rope passes rearwardly to the rope tender which deposits the rope into a storage container which can be removably mounted on the rope tender. The pulling apparatus of this invention is also ideally well-suited for pulling electric cable or wires between the towers of an electrical transmission line and for pulling electric cable or wire.

DESCRIPTION OF THE PREFERRED EMBODIMENT

The apparatus of this invention is referred to generally by the reference numeral 10 and includes a pulling unit 12 and an automatic rope tending unit 14. For purposes of description, the numeral 16 will refer to a conventional pipeline along which the electric cable is desired to be pulled.

Pulling unit 12 is preferably mounted in the bed or box of a conventional ½ or ¾ ton truck 18. Unit 12 includes a 25 H.P. engine 20 which operates a hydrostatic transmission. The transmission is operatively connected to hydraulic pump 22 which is operatively connected to hydraulic motor 24 as will be described in more detail hereinafter. Hydraulic motor 24 drives pinch wheel 26 which is mounted on the frame means 28 of the pulling unit 12. As seen in FIG. 1, pinch wheel 26 includes sheave portions 30 and 32 which are adapted to receive the torque balanced rope 34 therebetween as illustrated in the drawings.

Figure 2:
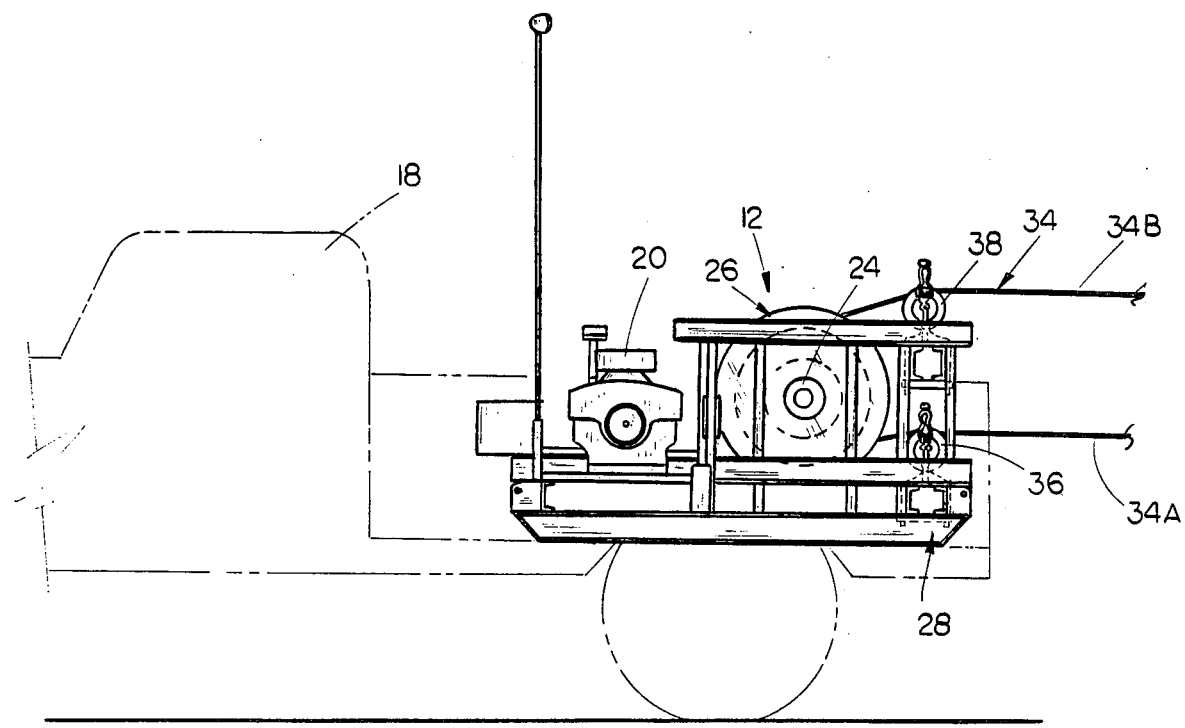
FIG. 2 is a side view of the apparatus of FIG. 1.
Figure 3:
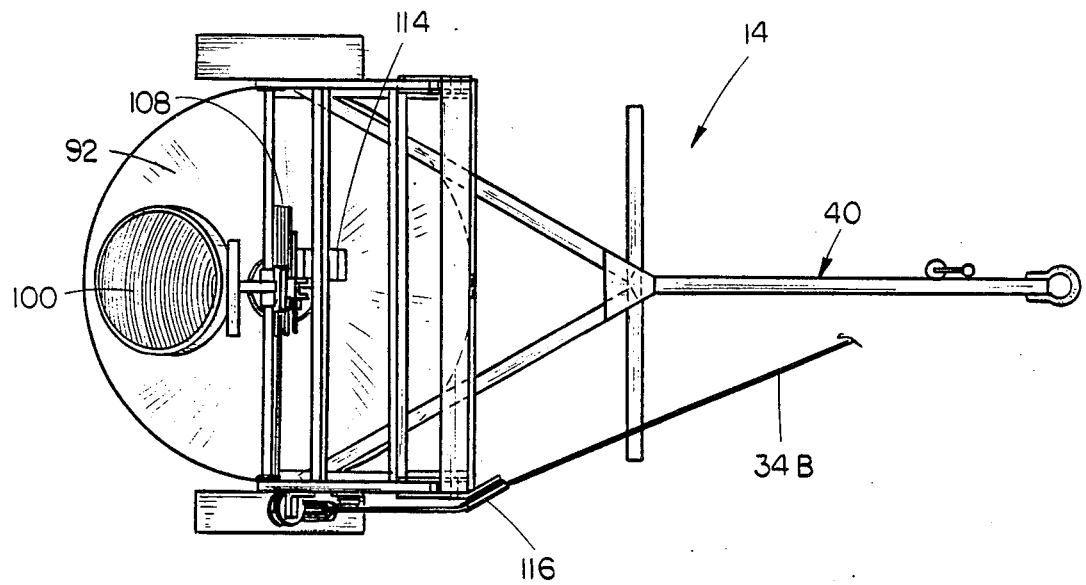
FIG. 3 is a top view of the automatic rope tender.
Figure 4:
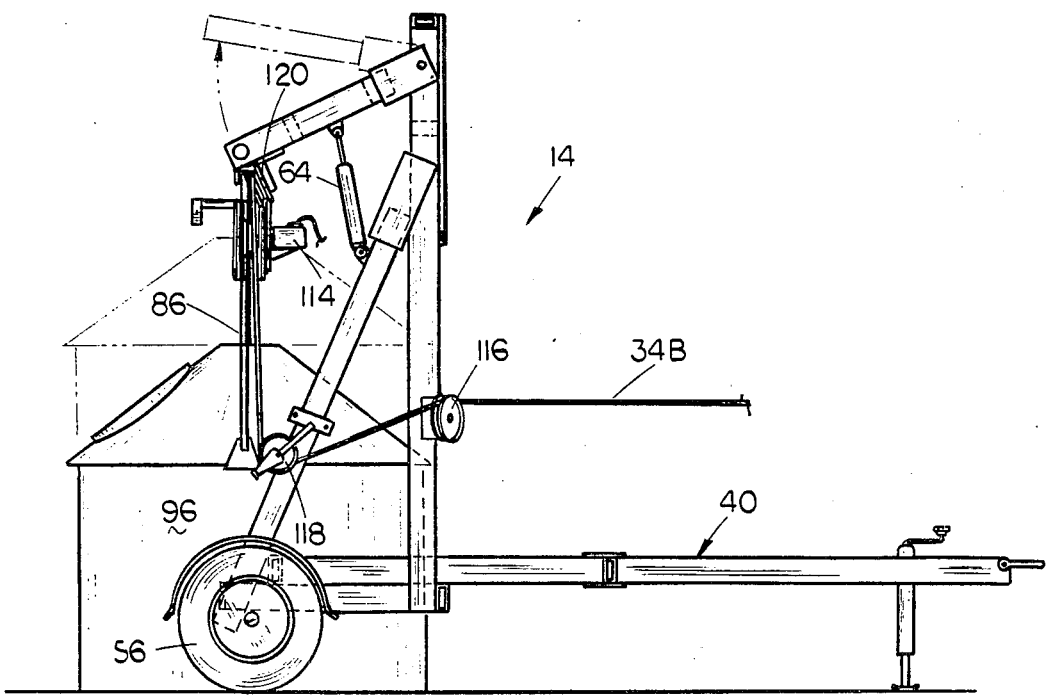
FIG. 4 is a side view of the rope tender of FIG. 3.

Preferably, rope 34 is a ¾ inch polyester double braid rope which is torque balanced having a working capacity of 3,000 pounds with a 2½% elongation. It is recommended that the rope 34 be designed so as to be usable to −70° F. As seen in FIG. 2, rope 34 passes over pulley or sheave 36 as it approaches pinch wheel 26 and passes over sheave or pulley 38 as it leaves pinch wheel 26. For purposes of description, the working end of the rope will be identified as 34A while the tail end of the rope 34 will be referred to as 34B.

Figure 7:
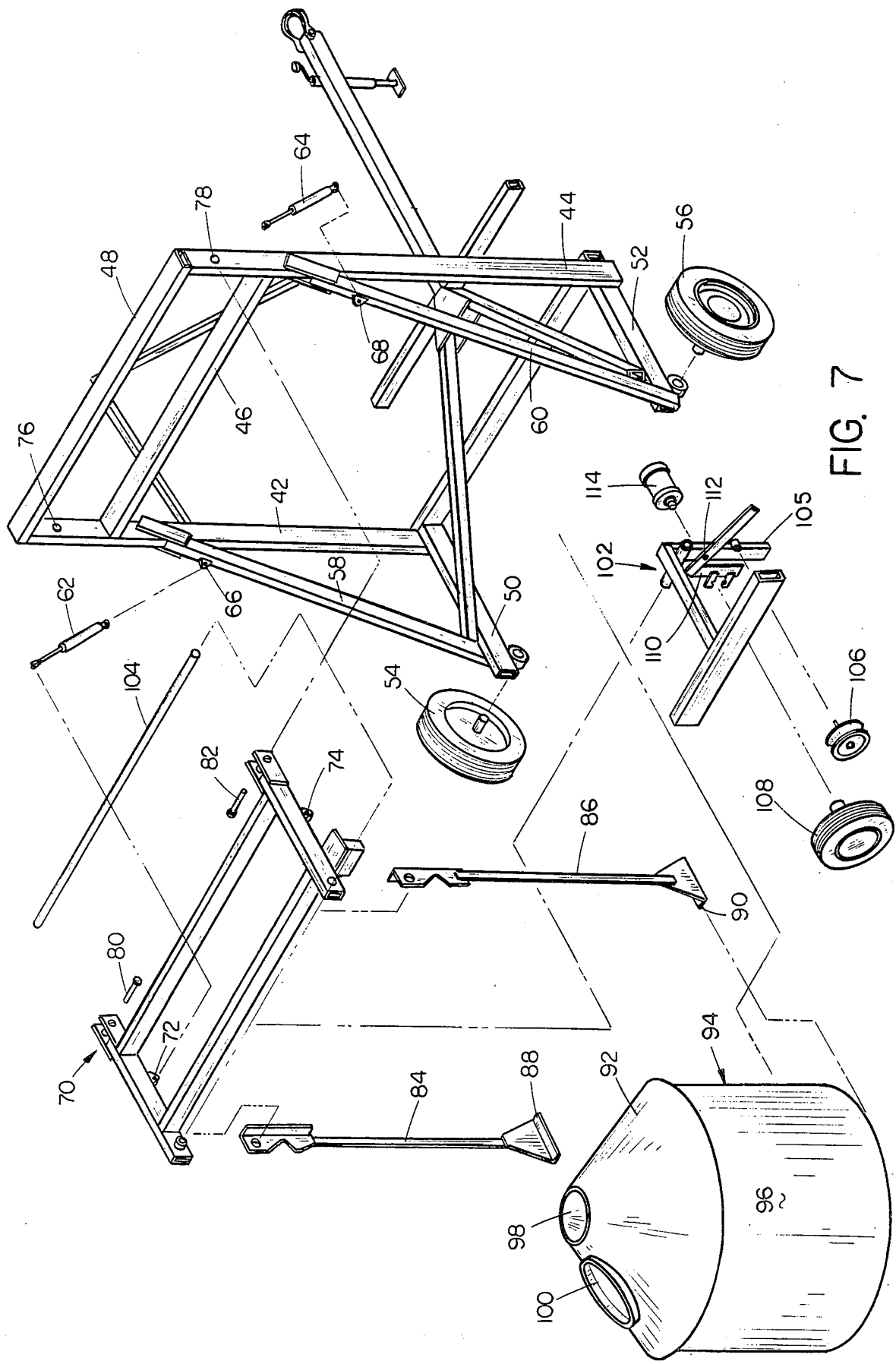
FIG. 7 is an exploded perspective view of the automatic rope tender.

The rope tender 14 generally comprises a wheeled frame means in the form of a trailer 40 which is adapted to be secured to the hitch of the truck 18. Trailer 40 includes a pair of spaced-apart uprights 42 and 44 having braces 46 and 48 extending between the upper ends thereof as seen in FIG. 7. Rearwardly extending frame members 50 and 52 extend from the lower ends of uprights 42 and 44 and have the wheels 54 and 56 operatively secured thereto. Frame member 58 extends between the upper end of upright 42 and the rearward end of frame member 50 and frame member 60 extends between the upper end of upright 44 and the rearward end of frame member 52. The lower ends of hydraulic cylinders 62 and 64 are pivotally connected to frame members 58 and 60 at 66 and 68 respectively. The rod ends of cylinders 62 and 64 are pivotally connected to a lift arm assembly 70 at 72 and 74 respectively. Lift arm assembly 70 is pivotally connected to uprights 42 and 44 at 76 and 78 by means of pins 80 and 82 respectively. Lifting arms 84 and 86 are pivotally connected to the rearward end of the lift arm assembly 70 and have lower ends 88 and 90 which are adapted to engage the lower end of top portion 92 of container 94. As seen in the drawings, container 94 includes a cylindrical bottom portion 96 and the conical-shaped top portion 92. Top portion 92 is provided with a central opening 98 and a visual inspection and access opening 100 which is selectively closed by a transparent cover.

Rope tender assembly 102 is mounted on shaft 104 so as to be positioned over container 94. Assembly 102 includes a vertically disposed frame member 105 having wheel 106 rotatably mounted thereon. Drive wheel 108 is mounted on frame member 110 which is pivotally connected to frame member 105 at 112. Wheel 108 is driven by hydraulic motor 114. The pivotal arrangement of frame member 110 with frame member 104 causes the periphery of wheel 108 to be in yieldable frictional engagement with wheel 106. Pulleys of sheaves 116, 118 and 120 guide the rope 34B to the engagement of wheels 106 and 108. Thus, rotation of the wheel 108 by the motor 114 causes the rope 34B to be passed downwardly therebetween into the central opening 98 of container 94 as will be described in more detail hereinafter.

Figure 5:
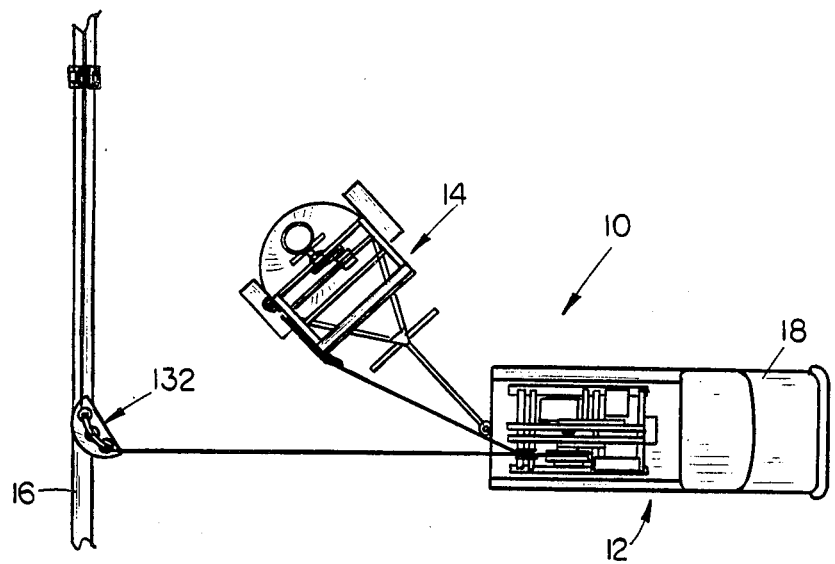
FIG. 5 is a top view illustrating the apparatus of this invention being employed to pull cable.
Figure 6:
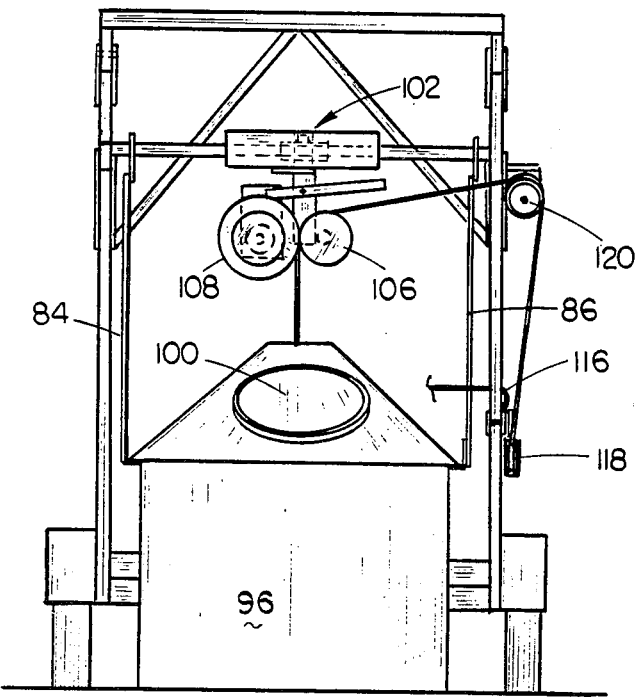
FIG. 6 is a rear view of the automatic rope tender of FIGS. 3 and 4.
Figure 8:
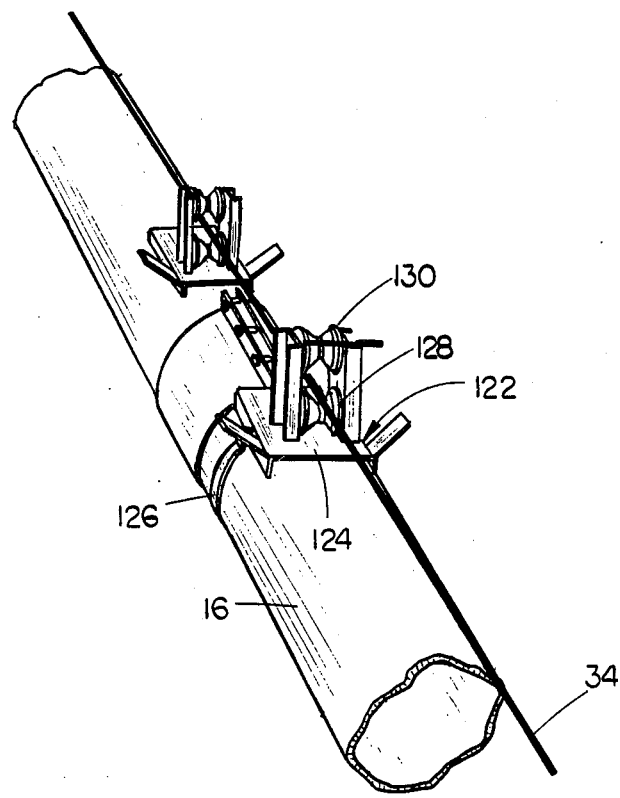
FIG. 8 is a perspective view of sheave supports mounted on the pipeline.
Figure 9:
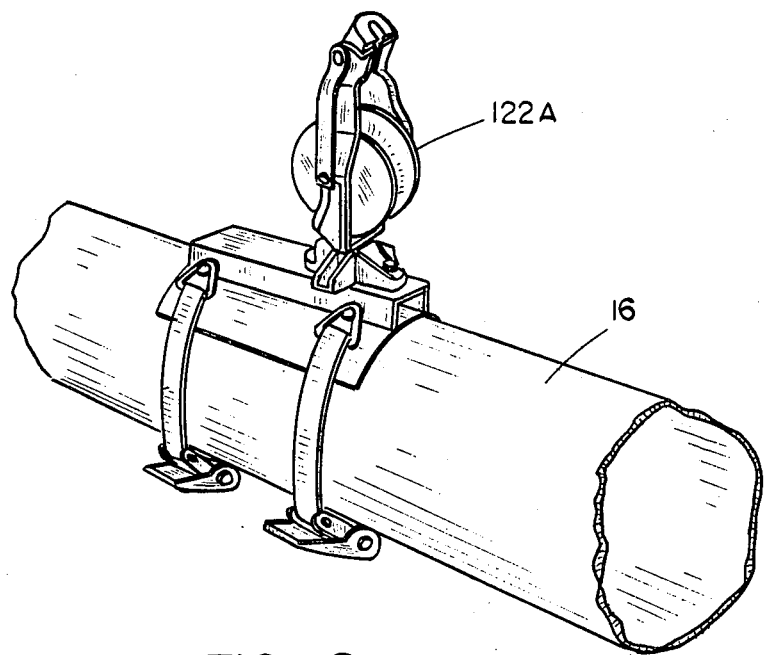
FIG. 9 is a perspective view of another type of sheave support.
Figure 14:
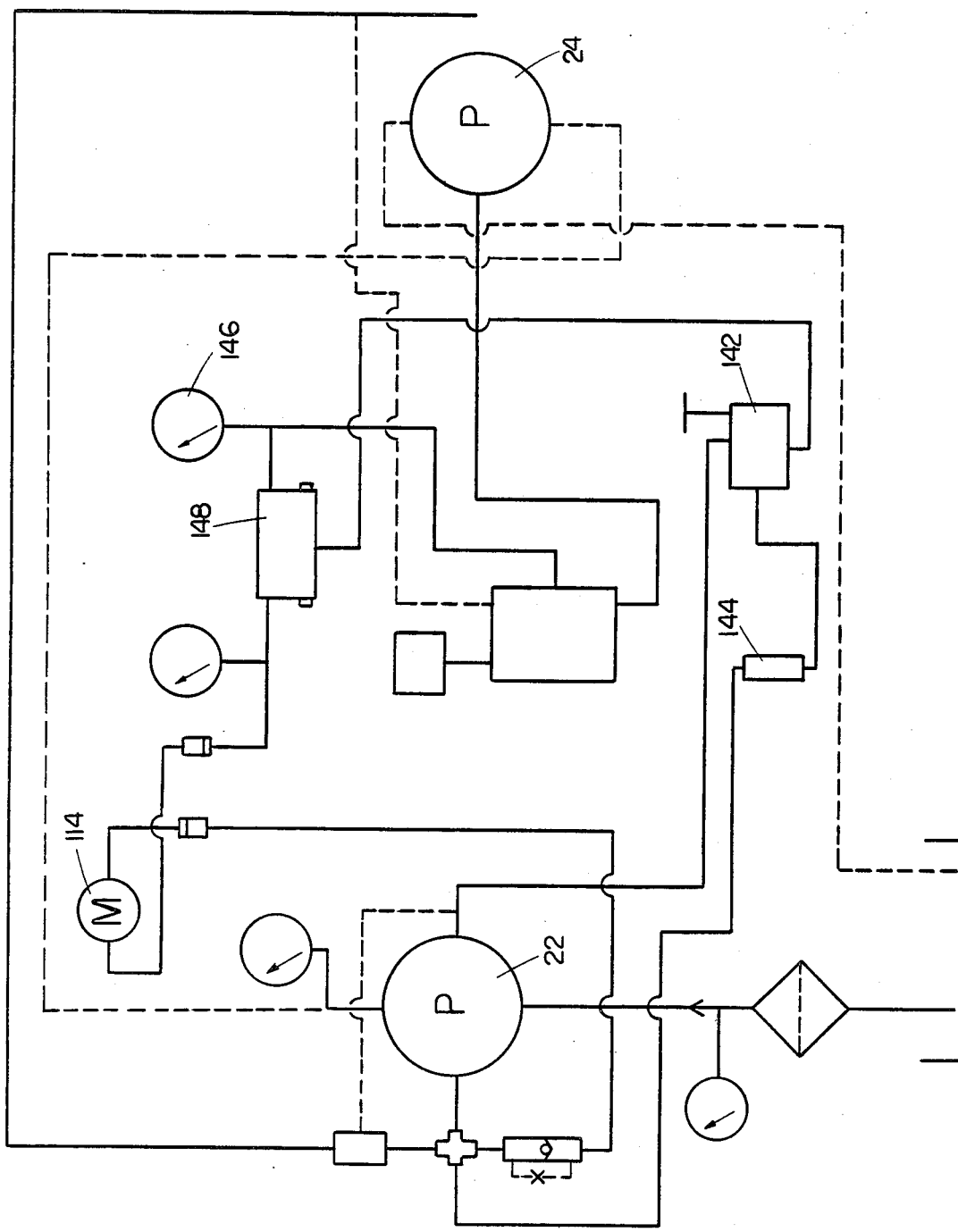
FIG. 14 is a schematic view of the hydraulic circuitry of this invention.

When it is desired to pull electric cable along the length of the pipeline 16, the rope normally contained in the container 24 is pulled therefrom and is passed through the various sheaves and sheave supports as illustrated in FIGS. 8, 9 and 10 which are secured to the pipeline by means of straps. For example, FIG. 8 illustrates a sheave support 122 including a base 124 which is secured to the pipeline 16 by means of strap 126. A pair of sheaves 128 and 130 are rotatably mounted on the base 124 as illustrated in FIG. 8 and are adapted to have the rope 34 extending therebetween. A different type of sheave support is illustrated in FIG. 9 and is referred to generally by the reference numeral 122A. FIGS. 10-13 illustrate a sheave assembly 132 which is adapted to be secured to the pipeline 16 as illustrated in FIGS. 5 and 13. As seen in the drawings, the sheave support 132 is secured to the pipeline 16 by means of strap 134 and includes a plurality of rollers or sheaves 136, 138 and 140 mounted thereon to enable the rope to be pulled at right angles to the length of the pipeline as best illustrated in FIG. 5.

When it is desired to pull the electric cable along the length of the pipeline, the rope 34 is pulled out of the container 24 and fed through the various sheave supports secured to the length of the pipeline. Rope 34 can have a length of approximately 4400 feet. Thus, the rope is pulled approximately 4000 to 4400 feet along the length of the pipeline where it is secured to the cable to be pulled. The rope 34 is then passed around the pinch wheel 26 and over the pulleys 116, 118, 120 and between the wheels 106 and 108.

The storage container is preferably left on the ground during the pulling operation and the pickup is jackknifed to about 15° to the driver's side as illustrated in FIG. 5. The recommended pulling procedure is to start the operation with the pressure relief valve 142 backed out so that some oil flow is indicated when power is applied by means of the hydrostatic transmission control lever. The relief valve 142 is slowly turned until the oil flow in the sight glass 144 indicates "0" at which time the pinch wheel 26 will be turning and pulling in rope at whatever force is required to move the load. With the valve set in this manner, the relief valve 142 will open under a load increase, dumping the oil flow and stop the rotation of the pinch wheel drive. If the relief valve is properly set, it will work as a safety device to prevent excessive force on the rigging or the electric cable being pulled. Oil should not be permitted to by-pass the relief more than a few seconds as the hydraulic fluid could become overheated. As pulling progresses, it may be necessary to slightly increase the setting of the relief valve 142 because of the increased drag of the electric cable. The increased drag will be indicated as being necessary when the flow indicator indicates "flow". An increase in pulling-force will also be indicated by a higher reading on the large diameter pressure gauge 146.

A flow divider valve 148 is provided in the hydraulic circuit to permit a majority of the oil to flow to the pinch wheel drive and the remainder to the automatic rope tender motor 114. It is recommended that the motor 114 be operated at a rate such that it will pull the rope at a slightly greater rate than that being supplied thereto by the pinch wheel 24. It is recommended that the motor 114 pull the rope at approximately 5% greater speed than being furnished thereto by the pinch wheel.

Thus, rotation of the pinch wheel at the desired speed causes the rope 34 to be pulled along the length of the pipeline so that the electric cable connected thereto will also be pulled along the length of the pipeline. The operator can visually determine the pulling pressure and if undue pressures are experienced, the hydraulic system will be relieved thereby preventing damage to the rope 34 or the electric cable being pulled thereby. The pinch wheel 24 pulls the rope along the length of the pipeline and the free end 34B is fed to the wheels 106 and 108. Rotation of the drive wheel 108 by the motor 114 causes the rope 34 to be pulled rearwardly from the pinch wheel and dumped into the central opening 98 of the storage container 94. The fact that the rope is torque balanced means that the rope will simply fall into the container without the objectionable twisting normally associated with ropes.

When the cable has been completely pulled, the rope 34 is disconnected from the cable and the lift arms 84 and 86 may be moved into engagement with the lower end of the ground portion 92 of container 94 to raise the container out of ground engagement. With the container lifted out of ground engagement, the container may be moved from one location to another. If the pulling operation has not been completed by quitting time or the like, the rope 34 may be disengaged from the pinch wheel 24 and the pulleys on the rope tender so that the entire apparatus, with the exception of the container 94, may be moved from the job site and placed in warm storage for the night. Thus it can be seen that the apparatus of this invention accomplishes at least all of its stated objectives.

I claim:

1. An apparatus for pulling a wire means between two locations, comprising in combination, a first wheeled frame means having rearward and forward ends, a rotatable pinch wheel mounted on said first wheeled frame means adapted to receive a torque balanced pulling rope therearound whereby rotation of said pinch wheel will cause the pulling rope to be pulled towards the rearward end of said first wheeled frame means, said torque balanced pulling rope having one end connected to the wire means, a power means on said first wheeled frame means for rotating said pinch wheel, a second wheeled frame means positioned rearwardly of said first wheeled frame means, a powered rope puller mounted on said second wheeled frame means for pulling the rope towards said second wheeled frame means after the rope has passed around said pinch wheel and has been disengaged therefrom, a pair of powered lifting arms vertically movably mounted on said second wheeled frame means, a rope tender container positioned on the ground below said rope puller for receiving and storing the pulled rope therein after it has disengaged from said rope puller, said lifting arms being selectively attachable to said container so that said lifting arms may lift said container from the ground for transporting said container, said pinch wheel and said rope puller including means to permit the rapid disengagement thereof with said rope whereby said first and second wheeled frame means may be moved to a different location without said container and pulling rope at any time during the pulling operation regardless of how much of the rope has been passed through the rope puller.

2. The combination of claim 1 wherein said container has a cylindrical bottom portion and a cone shaped top portion, said top portion having a central opening formed therein for receiving said rope.

3. The combination of claim 2 wherein said cone shaped top portion protrudes outwardly beyond said bottom portion, said lifting arms adapted to engage the protruding portion of said cone shaped top portion for raising and lowering said container.

4. The combination of claim 2 wherein said top portion of said container has a closable visual inspection opening formed therein.

5. The combination of claim 4 wherein said inspection opening is closed by a removable transparent cover.

6. The combination of claim 1 wherein the wire means comprises an electric cable which is to be pulled along the length of a pipeline, and a plurality of rotatable sheaves secured to said pipeline along the length thereof, said pulling rope and said wire means extending through said sheaves.

7. The combination of claim 1 wherein a control means is provided for preventing excessive tension from being applied to the cable being pulled.

* * * * *